(12) United States Patent
Ohtani

(10) Patent No.: US 6,786,201 B2
(45) Date of Patent: Sep. 7, 2004

(54) FUEL INJECTION CONTROL APPARATUS OF CYLINDER INJECTION TYPE INTERNAL COMBUSTION ENGINE

(75) Inventor: Motoki Ohtani, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 10/600,762

(22) Filed: Jun. 23, 2003

(65) Prior Publication Data

US 2004/0007209 A1 Jan. 15, 2004

(30) Foreign Application Priority Data

Jul. 12, 2002 (JP) ........................................ 2002-204212

(51) Int. Cl.⁷ ............................................. F02D 41/06
(52) U.S. Cl. ...................... 123/431; 123/299; 123/491; 703/113
(58) Field of Search ................................ 123/299, 300, 123/304, 305, 431, 472, 457, 445, 480, 491, 494; 701/103–105, 113

(56) References Cited

U.S. PATENT DOCUMENTS 6,357,417 B2 * 3/2002 Kato .......................... 123/305

FOREIGN PATENT DOCUMENTS

JP 10-18884 A 1/1998
JP 11-270385 A 10/1999

* cited by examiner

Primary Examiner—Hai Huynh
(74) Attorney, Agent, or Firm—Kenyon & Kenyon

(57) ABSTRACT

A fuel injection control apparatus for an engine includes a controller. The controller controls a main fuel injection valve and an auxiliary fuel injection valve. The controller predicts whether the pressure of the pressurized fuel decreases below a permissible value, which is less than a predetermined value, during a period from a point of time after the pressure of the pressurized fuel becomes greater than or equal to the predetermined value till when fuel injected from the auxiliary fuel injection valve reaches the interior of a cylinder of the engine. When the pressure of the pressurized fuel is greater than or equal to the predetermined value, and it is predicted that the pressure of the pressurized fuel will not decrease below the permissible value during the period, the controller causes the main fuel injection valve to start injecting the pressurized fuel.

12 Claims, 3 Drawing Sheets

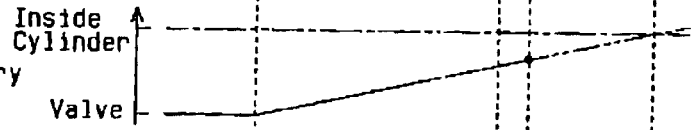
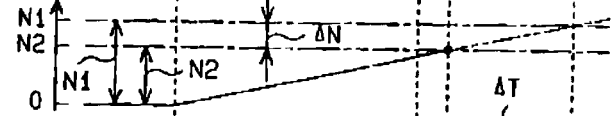
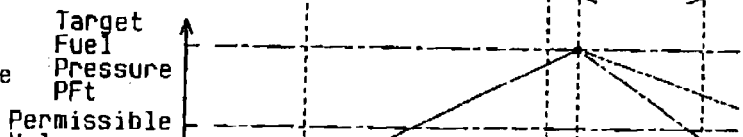
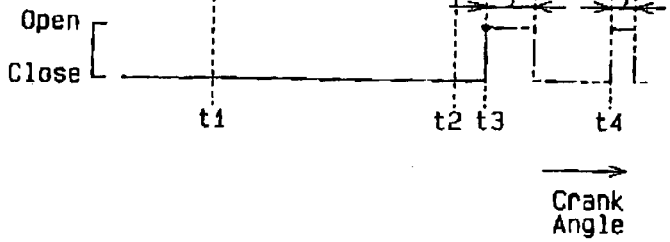

FUEL INJECTION CONTROL APPARATUS OF CYLINDER INJECTION TYPE INTERNAL COMBUSTION ENGINE

BACKGROUND OF THE INVENTION

The present invention relates to a fuel injection control apparatus of a cylinder injection type internal combustion engine.

For example, Japanese Laid-Open Patent Publication No. 10-18884 discloses a fuel injection control apparatus that includes main fuel injection valves, each of which directly injects fuel into one of the combustion chambers (cylinders), and an auxiliary fuel injection valve, which injects fuel into an intake passage. In the case with the fuel injection control apparatus of the publication, part of fuel required for cranking the engine is injected from the auxiliary fuel injection valve, in addition to the fuel injected from main fuel injection valves. Injected fuel is sufficiently mixed with intake air flowing through the intake passage and is introduced into the corresponding combustion chamber after being vaporized. Since the auxiliary fuel injection valve also injects fuel, the engine is reliably started.

In the above mentioned internal combustion engine, fuel that is highly pressurized by a high pressure pump, which is driven by the engine, is supplied to each main fuel injection valve to inject the fuel from each main fuel injection valve against the pressure in the corresponding combustion chamber.

During cranking of the engine and immediately after the engine is started, fuel is not pressurized sufficiently by the high pressure pump. Therefore, the pressure of fuel supplied to each main fuel injection valve is low and atomization of fuel injected from the main fuel injection valve is insufficient. In addition, when the fuel pressure is decreased, the amount of fuel injected from each main fuel injection valve per unit time is decreased. Thus, the fuel injection time needs to be increased to inject an amount of fuel that is the same as the amount of fuel that is injected when the fuel pressure is not decreased. When the fuel injection start timing is advanced to the top dead center or in the vicinity of the top dead center of the intake stroke of each piston, fuel is injected when the piston approaches the corresponding main fuel injection valve. Thus, the fuel adheres to the top surface of each piston. When the engine is started, the temperature of the top surface of each piston is low and the adhered fuel is not easily vaporized. Therefore, the amount of fuel adhered to the top surface of each piston gradually increases and the fuel is accumulated in the form of liquid. The fuel adhered to the top surface of each piston causes incomplete combustion. Accordingly, black smoke is exhausted, which deteriorates emission during the cranking of the engine.

A few measures have been introduced to address the above draw back. For example, Japanese Laid-Open Patent Publication No. 11-270385 discloses a fuel injection control apparatus that starts fuel injection from a main fuel injection valve on condition that the fuel pressure becomes greater than or equal to a predetermined value. According to this fuel injection control apparatus, atomization of fuel is prevented from deteriorating, and the amount of fuel that adheres to the top surface of each piston is decreased, which suppresses emission of black smoke.

Since only small amount of fuel contributes to combustion at a very low temperature, a large amount of fuel is required particularly during the cranking of the engine. In this state, the amount of fuel injected from the fuel injection valves becomes greater than the amount of fuel discharged from the high pressure pump. This decreases the fuel pressure after the fuel injection is started.

When the auxiliary fuel injection valve is located in the intake passage, the required amount of fuel is injected from the auxiliary fuel injection valve. Thus, the amount of fuel injected from each main fuel injection valve can be reduced to suppress the decrease of the fuel pressure. However, it takes a predetermined time for the fuel injected from the auxiliary fuel injection valve to flow into the combustion chambers. In the meantime, a large amount of fuel needs to be injected from each main fuel injection valve. Therefore, fuel pressure is greatly decreased during the time the fuel injected from the auxiliary fuel injection valve flows into the combustion chambers. This hinders sufficient suppression of the deterioration of the emission.

SUMMARY OF THE INVENTION

Accordingly, it is an objective of the present invention to provide a fuel injection control apparatus of a cylinder injection type internal combustion engine that suppresses deterioration of emission.

To achieve the above objective, the present invention provides a fuel injection control apparatus for an internal combustion engine. The internal combustion engine includes a cylinder, an intake passage, which is connected to the cylinder, a main fuel injection valve, and an auxiliary fuel injection valve. The main fuel injection valve directly injects pressurized fuel, which is supplied from a high pressure pump, to the cylinder. The auxiliary fuel injection valve injects fuel to the intake passage. The apparatus includes a controller. The controller controls the main fuel injection valve and the auxiliary fuel injection valve. The controller causes the auxiliary fuel injection valve to inject fuel during the cranking the internal combustion engine and determines whether the pressure of the pressurized fuel is greater than or equal to a predetermined value. The controller predicts whether the pressure of the pressurized fuel decreases below a permissible value, which is less than the predetermined value, due to injection of pressurized fuel by the main fuel injection valve during a period from a point of time after the pressure of the pressurized fuel becomes greater than or equal to the predetermined value till when fuel injected from the auxiliary fuel injection valve reaches the interior of the cylinder through the intake passage. When the pressure of the pressurized fuel is greater than or equal to the predetermined value, and it is predicted that the pressure of the pressurized fuel will not decrease below the permissible value during the period, the controller causes the main fuel injection valve to start injecting the pressurized fuel.

The present invention also provides a controlling method of a fuel injection control apparatus of an internal combustion engine. The internal combustion engine includes a cylinder, an intake passage, which is connected to the cylinder, a main fuel injection valve, and an auxiliary fuel injection valve. The main fuel injection valve directly injects pressurized fuel, which is supplied from a high pressure pump, to the cylinder. The auxiliary fuel injection valve injects fuel to the intake passage. The method includes: causing the auxiliary fuel injection valve to inject fuel during cranking the internal combustion engine; determining whether the pressure of the pressurized fuel is greater than or equal to a predetermined value; predicting whether the pressure of the pressurized fuel decreases below a permissible value, which is less than the predetermined value, due to injection of pressurized fuel by the main fuel injection valve during a period from a point of time after the pressure of the pressurized fuel becomes greater than or equal to the predetermined value till when fuel injected from the auxiliary fuel injection valve reaches the interior of the cylinder through the intake passage; and causing the main fuel injection valve to start injecting the pressurized fuel when the pressure of the pressurized fuel is greater than or equal to the predetermined value, and it is predicted that the pressure of the pressurized fuel will not decrease below the permissible value during the period.

Other aspects and advantages of the invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which:

FIGS. 3(a), 3(b), 3(c), 3(d), and 3(e) are timing charts explaining operation of the fuel injection control apparatus.

DETAILED DESCRIPTION OF THE PREFERRED EMBODIMENT

A preferred embodiment of the present invention will now be described with reference to FIGS. 1 to 3(e).

Figure 1:
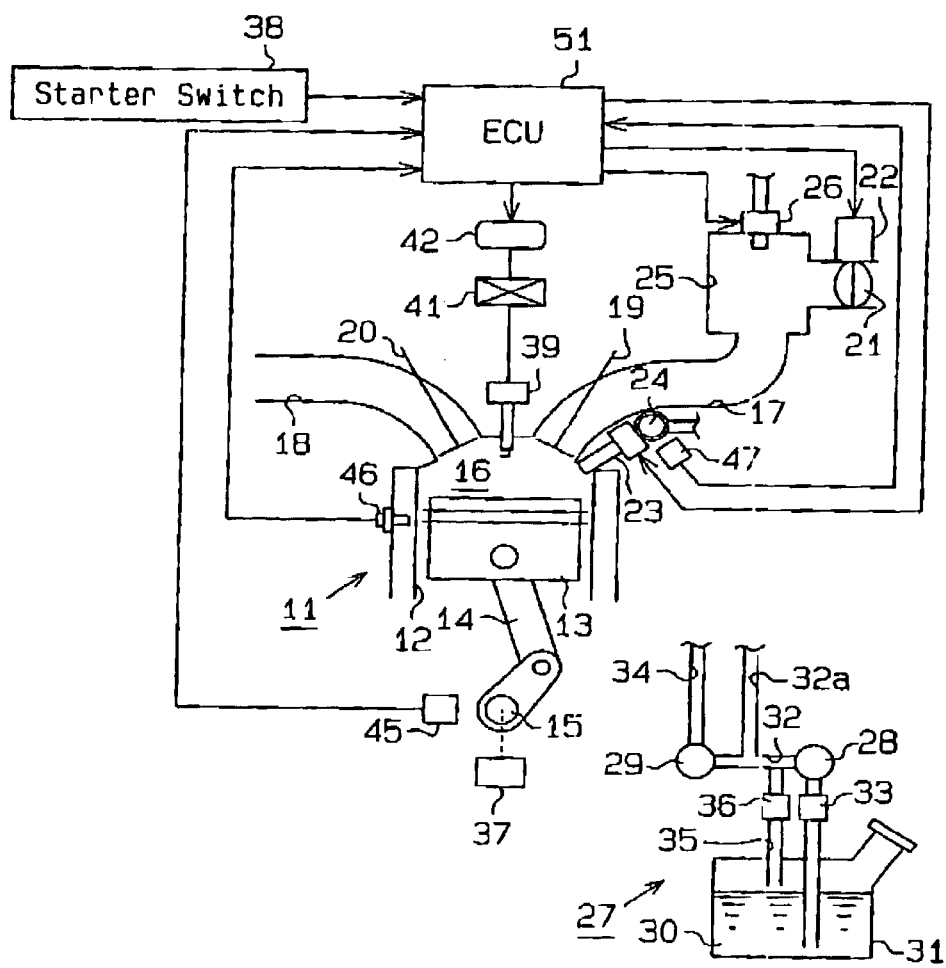
FIG. 1 is a schematic diagram illustrating the structure of a preferred embodiment of the present invention.

As shown in FIG. 1, a cylinder injection type gasoline engine 11 is mounted on a vehicle. The engine 11 has cylinders 12 (only one is shown in FIG. 1). Each cylinder 12 accommodates a piston 13. Each piston 13 is coupled with a crank shaft 15, which is an output shaft of the engine 11, via a connecting rod 14. Reciprocation of each piston 13 is transmitted to the crank shaft 15 after being converted to rotational force by the connecting rod 14.

Each cylinder 12 defines a combustion chamber 16. Each cylinder 12 is connected to an intake passage 17, which introduce air outside the engine 11 into the combustion chambers 16. Each cylinder 12 is also connected to an exhaust passage 18 for exhausting exhaust gas generated in the corresponding combustion chamber 16 to the outside of the engine 11. Each cylinder 12 has an intake valve 19 and an exhaust valve 20. When each intake valve 19 reciprocates, the corresponding combustion chamber 16 is selectively connected to and disconnected from the intake passage 17. When the exhaust valve 20 reciprocates, the corresponding combustion chamber 16 is selectively connected to and disconnected from the exhaust passage 18.

A surge tank 25 is located in the intake passage 17. The intake passage 17 includes passages, which branches from the surge tank 25 to the corresponding cylinder 12. A throttle valve 21 is rotatably located upstream of the surge tank 25. The throttle valve 21 is coupled to an actuator 22, such as a step motor. The actuator 22 is controlled by an electronic control unit (ECU) 51, which will be described later, to rotate the throttle valve 21. The amount of air that flows through the intake passage 17 varies in accordance with the rotational angle of the throttle valve 21.

An electromagnetic main fuel injection valve 23 is arranged corresponding to each cylinder 12. The main fuel injection valves 23 are connected to a delivery pipe 24. Highly pressurized fuel in the delivery pipe 24 is supplied to each main fuel injection valve 23. An electromagnetic auxiliary fuel injection valve 26 is attached to the surge tank 25.

The vehicle includes a fuel feed device 27 for supplying fuel to the main fuel injection valves 23 and the auxiliary fuel injection valve 26. The fuel feed device 27 includes a low pressure pump 28 and a high pressure pump 29. The low pressure pump 28 is driven by an electric motor (not shown) to draw in fuel 30 in a fuel tank 31 through a filter 33 and discharge the fuel 30. Part of the discharged fuel is conveyed to the high pressure pump 29 through a low pressure fuel passage 32. The low pressure fuel passage 32 is connected to the auxiliary fuel injection valve 26 via a branched passage 32a, which branches from the low pressure fuel passage 32. Part of the fuel 30 discharged from the low pressure pump 28 is fed to the auxiliary fuel injection valve 26 through the branched passage 32a.

The high pressure pump 29 is coupled with a camshaft (not shown) of the engine 11. When a cam (not shown), which is attached to the cam shaft, is rotated once, a plunger reciprocates twice and the fuel is draw in and pressurized twice. The high pressure pump 29 pumps fuel once every time fuel is injected from two of the main fuel injection valves 23. The high pressure pump 29 also injects a required amount of fuel when the electromagnetic valve is closed at the optimal timing during compression stroke. The injected fuel is transmitted to the delivery pipe 24 through a high pressure fuel passage 34. The low pressure fuel passage 32 is connected to the fuel tank 31 via a relief passage 35. A pressure control valve 36 is located in the relief passage 35. The pressure control valve 36 opens when the fuel pressure in the low pressure fuel passage 32 becomes greater than or equal to a predetermined value, and returns the fuel to the fuel tank 31 via the relief passage 35.

Each main fuel injection valve 23 is controlled to be selectively opened and closed so that highly pressurized fuel supplied through the delivery pipe 24 is directly injected into the corresponding cylinder 12. Each main fuel injection valve 23 starts to inject fuel when the condition is met that the pressure of fuel (fuel pressure PF) supplied to the main fuel injection valve 23 is greater than or equal to a predetermined value, particularly during the cranking of the engine. In the preferred embodiment, a target fuel pressure PFt is used as the predetermined value. The target fuel pressure PFt is a target value of the fuel pressure supplied to each main fuel injection valve 23 and is a suitable fuel pressure during the cranking of the engine 11. That is, the target fuel pressure PFt is a fuel pressure that forms sufficient particulates of fuel required for cranking the engine 11 regardless of decrease of the fuel pressure PF by the injection of fuel. The injected fuel is mixed with the air in the corresponding cylinder 12, which forms air-fuel mixture.

On the other hand, the auxiliary fuel injection valve 26 functions to reliably maintain the amount of fuel required for cranking the engine 11 when the engine 11 has a low temperature and the required fuel amount cannot be maintained with only the main fuel injection valves 23. That is, when the engine is cold, or particularly when the engine is very cold, the atomization efficiency of fuel deteriorates, which hinders cranking of the engine 11. In addition, since the viscosity of lubricant oil is high, friction is increased and the engine rotational speed for the cranking becomes slow. Accordingly, the fuel pressure cannot be increased sufficiently with the mechanically driven high pressure pump 29. As a result, the required amount of fuel cannot be supplied to the cylinders 12 with only the main fuel injection valves 23, although the valve opening time is increased. This might further deteriorate the cranking of the engine 11.

To solve the above drawback, when cranking the engine 11, fuel is injected from the auxiliary fuel injection valve 26, in addition to the main fuel injection valves 23. That is, when a driver manipulates a starter switch 38 to turn on a starter 37, current is supplied to the auxiliary fuel injection valve 26. When the starter 37 is turned on, the auxiliary fuel injection valve 26 starts to inject fuel. Current is supplied to the auxiliary fuel injection valve 26 for a time determined corresponding to the temperature of the engine 11. The fuel injected from the auxiliary fuel injection valve 26 to the surge tank 25 mixes with the air in the surge tank 25 to form air-fuel mixture. The air-fuel mixture moves through the intake passage 17 and flows into each cylinder 12 every time an intake stroke is performed in the cylinder 12. The fuel injected from the auxiliary fuel injection valve 26 is added to the fuel injected from the main fuel injection valves 23. To distinguish the injected fuel, the fuel injected from the main fuel injection valves 23 will be referred to as main fuel and the fuel injected from the auxiliary fuel injection valve 26 will be referred to as auxiliary fuel.

The engine 11 includes ignition plugs 39. Each ignition plug 39 is attached to one of the cylinders 12. Each ignition plug 39 is connected to one of igniters 42 via one of ignition coils 41. Each igniter 42 interrupts primary current of the corresponding ignition coil 41 on an intermittent basis in accordance with ignition signals. The interruption causes high voltage in a secondary coil of the ignition coil 41 and ignites the corresponding ignition plug 39. The air-fuel mixture is ignited and combusted by a spark discharge caused by ignition of the ignition plug 39. Each piston 13 reciprocates by combustion gas having a high temperature and a high pressure generated when the air-fuel mixture is combusted. The reciprocation of the pistons 13 rotates the crank shaft 15 so that a driving force (output torque) of the engine 11 is obtained.

Several sensors are located on the vehicle to detect the driving condition of the engine 11. For example, a crank angle sensor 45 is located in the vicinity of the crank shaft 15. The crank angle sensor 45 generates a pulse signal every time the crank shaft 15 is rotated by a predetermined angle. The signal of the crank angle sensor 45 is used for calculating the rotational angle of the crank shaft 15, which is the crank angle, and the rotational speed of the crank shaft 15, which is the engine rotational speed NE. A water temperature sensor 46 is located in the engine 11. The water temperature sensor 46 detects the temperature of the coolant (coolant temperature THW). Further, a fuel pressure sensor 47 is attached to the delivery pipe 24. The fuel pressure sensor 47 detects the pressure (fuel pressure PF) of fuel supplied to the main fuel injection valve 23. Other sensors are also attached to the engine 11, or the like, but detailed explanations are omitted.

An electronic control unit (ECU) 51, which is formed mainly by a microcomputer, is provided to control parts of the engine 11. In the ECU 51, a central processing unit (CPU) executes a computing process in accordance with a control program and initial data stored in a read only memory (ROM) based on signals from the sensors. The ECU 51 executes several controls in accordance with the computed result. Signals used for the computing process include detection values of several sensors, which are the crank angle sensor 45, the water temperature sensor 46, and the fuel pressure sensor 47, and a signal of the starter switch 38. The computed result of the CPU is temporarily stored in a random access memory (RAM).

Figure 2:
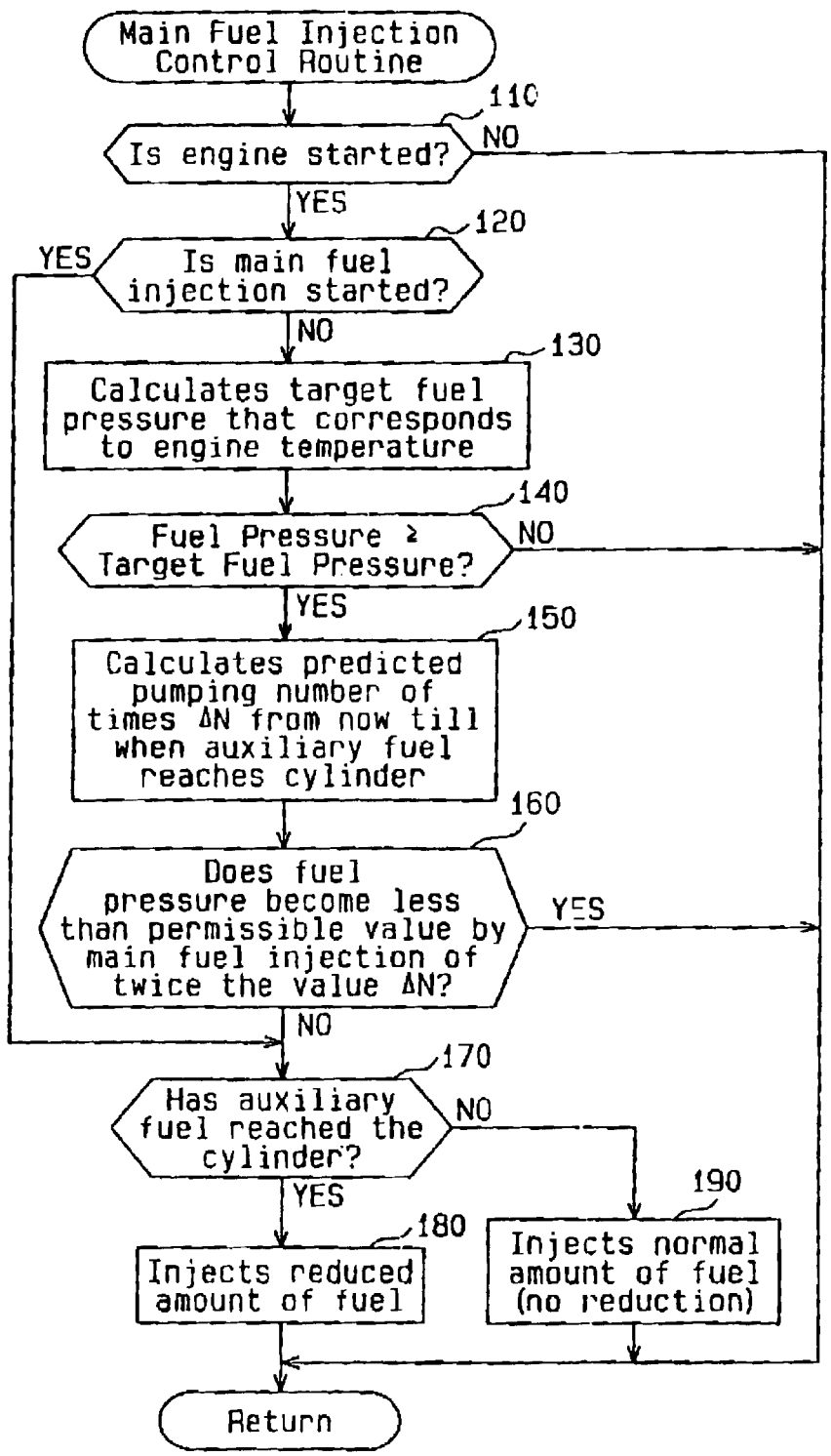
FIG. 2 is a flowchart showing a routine for controlling fuel injection of main fuel injection valves.

A control performed by the fuel injection control apparatus of the preferred embodiment will now be described. FIG. 2 is a flowchart showing a main fuel injection control routine for controlling fuel injection from the main fuel injection valves 23 during the cranking of the engine 11. The routine is executed at a predetermined timing, such as every time each cylinder 12 performs a main fuel injection.

In step S110, the ECU 51, for example, judges whether the engine 11 is being started in accordance with a signal from the starter switch 38. If it is determined that the engine 11 is being started, that is, if the decision outcome of step S110 is positive, the ECU 51 proceeds to step S120. If it is determined that the decision outcome of step S110 is negative, the ECU 51 temporarily terminates the main fuel injection control routine.

In step S120, the ECU 51 determines whether fuel injection from each main fuel injection valve 23 has already been started. If the fuel injection from each main fuel injection valve 23 has been started, the ECU 51 sets a flag. ECU 51 determines whether the flag is set in step S120. If the decision outcome of step S120 is positive, that is, if the flag is set, the ECU 51 proceeds to step S170, which will be described later. On the other hand, if the decision outcome of step S120 is negative, the ECU 51 proceeds to step S130.

In step S130, the ECU 51 calculates the value of the target fuel pressure PFt that corresponds to the current temperature of the engine 11. The coolant temperature THW detected by the water temperature sensor 46 is used as the engine temperature. The value of the target fuel pressure PFt is calculated considering the coolant temperature THW since the required fuel injection amount differs depending on the engine temperature. That is, when the engine is started while the engine temperature is low (cold cranking), the vaporization rate of the injected fuel decreases. Therefore, greater amount of fuel injection is generally required at the cold cranking as compared to when the engine is started while the engine temperature is high (normal cranking). Further, the required fuel injection amount increases as the engine temperature decreases. When a large amount of fuel is injected, the fuel pressure PF is decreased by a large amount. Thus, the target fuel pressure PFt needs to be increased. Accordingly, in step S130, the ECU 51 calculates the target fuel pressure PFt in accordance with the engine temperature, which is correlative to the increase of the fuel injection amount.

When calculating the target fuel pressure PFt, the ECU 51 may refer to a map, which specifies the relationship between the engine temperature and the target fuel pressure PFt, to increase the target fuel pressure PFt in accordance with the decrease of the engine temperature. The ECU 51 may calculate the value of the target fuel pressure PFt in accordance with a predetermined computing equation of the engine temperature and the target fuel pressure PFt.

In step S140, the ECU 51 determines whether the condition for starting the main fuel injection by each main fuel injection valve 23 is satisfied. More specifically, the ECU 51 determines whether the value of the current fuel pressure PF detected by the fuel pressure sensor 47 is greater than or equal to the target fuel pressure PFt calculated in step S130. If the decision outcome of step S140 is positive, that is, if the value of the current fuel pressure PF is greater than or equal to the target fuel pressure PFt (PF≧PFt), the ECU 51 proceeds to step S150. If the decision outcome of step S140 is negative, that is, if the value of the current fuel pressure PF is less than the target fuel pressure PFt (PF<PFt), the ECU 51 temporarily terminates the routine for the main fuel injection control.

In step S150, the ECU 51 calculates a predicted pumping number of times ΔN. The predicted pumping number of times ΔN represents how may times the high pressure pump 29 pumps the main fuel from when it is determined that the decision outcome of step S140 is positive till when auxiliary fuel reaches each cylinder 12. In other words, the ECU 51 obtains how many times the high pressure pump 29 pumps the main fuel before the auxiliary fuel reaches the cylinder 12. This calculation is performed in accordance with the following equation (1).

$$\Delta N = N1 - N2 \quad (1)$$

N1 in the equation (1) represents the pumping number of times of the high pressure pump 29 performed from when auxiliary fuel is injected from the auxiliary fuel injection valve 26 till when the auxiliary fuel reaches each cylinder 12. A pumping number of times N1 is obtained by, for example, dividing the capacity of the intake passage 17, which extends from the auxiliary fuel injection valve 26 to the cylinders 12, by the cylinder capacity per one intake stroke of each piston. N2 in the equation (1) is the actual pumping number of times performed by the high pressure pump 29 from when injection of auxiliary fuel has been started. A value of a counter, which is incremented every time the high pressure pump 29 pumps the main fuel, is used as a pumping number of times N2.

In step S160, the ECU 51 determines (predicts) whether the value of the fuel pressure PF, at which the main fuel is injected twice the value ΔN, is less than a permissible value α. As described above, the main fuel is injected twice while the main fuel is pumped from the high pressure pump 29 once. Therefore, ΔN×2 represents the number of times the main fuel is injected from the present moment till when the auxiliary fuel reaches each cylinder 12. The permissible value α is a value of the minimum fuel pressure PF required for the main fuel injection valve 23 to inject the main fuel and is less than the value of the target fuel pressure PFt. Decrease of the value of the fuel pressure PF when the main fuel is injected by the number of times corresponding to the predicted pumping number of times ΔN is obtained by multiplying the decreased amount of the fuel pressure PF per two injection by the predicted pumping number of times ΔN. That is, in step S160, the ECU 51 predicts whether the value of the fuel pressure PF becomes less than the permissible value α by the main fuel injection from each main fuel injection valve 23 performed during an arrival time ΔT, which is from the present moment till when the auxiliary fuel reaches each cylinder 12. If the decision outcome of step S160 is positive, that is, if it is predicted that the value of the fuel pressure PF will be less than the permissible value α, the ECU 51 temporarily terminates the main fuel injection control routine. In this case, the main fuel injection from each main fuel injection valve 23 is not started. If the decision outcome of step S160 is negative, the ECU 51 executes steps 170 to 190 to inject the main fuel from each main fuel injection valve 23.

In step 170, the ECU 51 determines whether the auxiliary fuel has reached each cylinder 12. More specifically, the ECU 51 compares the count value (pumping number of times N2) with the value of the pumping number of times N1. The ECU 51 determines that the auxiliary fuel has reached each cylinder 12 if the count value (N2) coincide with the pumping number of times N1.

If the decision outcome of step S170 is negative, that is, if the auxiliary fuel has not reached each cylinder 12, the ECU 51 proceeds to step S190. In step S190, the ECU 51 opens each main fuel injection valve 23 for a predetermined opening period T1 to inject a normal amount of fuel from the main fuel injection valve 23. The normal amount is the fuel amount required for the engine cranking. If the decision outcome of step S170 is positive, that is, if the auxiliary fuel has reached each cylinder 12, the ECU 51 proceeds to step S180. In step S180, the ECU 51 opens each main fuel injection valve 23 for an opening period T2 that is shorter than the opening period T1 to inject fuel from the main fuel injection valve 23 by an amount that is less than the normal amount, in other words, by an amount obtained by subtracting the auxiliary fuel amount from the required fuel amount during the cranking of the engine. After executing processes of steps S180 and S190, the ECU 51 temporarily terminates the routine for the main fuel injection control.

FIGS. 3(a) to 3(e) show operations of the fuel injection control apparatus when the process of FIG. 2 is executed. FIG. 3(c) schematically shows the pumping number of times with a straight line although the pumping number of times increases step by step every time the high pressure pump 29 pumps fuel. In the same manner, FIG. 3(d) schematically shows the fuel pressure PF with a straight line although the fuel pressure PF increases step by step every time the high pressure pump 29 pumps fuel.

When the starter 37 is turned on at a timing t1, the auxiliary fuel injection valve 26 is opened and starts injecting auxiliary fuel as shown in FIG. 3(a). After the timing t1, the auxiliary fuel injection valve 26 is kept opened until a timing t2 when an opening period of the auxiliary fuel injection valve 26 that is determined in accordance with the coolant temperature THW elapses. In the main fuel injection control routine, the steps S110, S120, S130, and S140 are repeatedly executed in this order (see FIG. 2) until the fuel pressure PF becomes greater than or equal to the target fuel pressure PFt (a timing t3). Therefore, as shown in FIG. 3(e), each main fuel injection valve 23 is closed until the timing t3 and the main fuel is not injected from the main fuel injection valve 23.

After the timing t1, as shown in FIG. 3(b), the position of the injected auxiliary fuel changes from the auxiliary fuel injection valve 26 to each cylinder 12. The pumping number of times increases by the operation of the high pressure pump 29 as shown in FIG. 3(c). Accordingly, the fuel pressure PF increases as shown in FIG. 3(d).

As shown in FIG. 3(d), when the current fuel pressure PF reaches the target fuel pressure PFt at the timing t3, the main fuel injection control routine executes processes in steps S110, S120, S130, S140, S150, and S160 in this order (see FIG. 2). In this processes, the ECU 51 predicts whether the value of the fuel pressure PF becomes less than the permissible value α by the main fuel injection performed during the arrival time ΔT, that is, from the present moment (in this case, the timing t3) to the timing t4. As shown by a dashed line in FIG. 3(d), if the ECU 51 predicts that the value of the fuel pressure PF becomes less than the permissible value α during the arrival time ΔT, or the decision outcome of step S160 in FIG. 2 is positive, the step 160 is repeatedly performed until it is predicted that the value of the fuel pressure PF becomes greater than the permissible value α. Although it is not shown in FIG. 3(e) for convenience, each main fuel injection valve 23 is not opened and the main fuel is not injected yet. Therefore, the high pressure pump 29 is driven to promptly increase the fuel pressure PF while the main fuel injection from each main fuel injection valve 23 is stopped. If it is predicted that the value of the fuel pressure PF does not become less than the permissible value α by the main fuel injection during the arrival time ΔT, that is, if the decision outcome of step S160 in FIG. 2 is negative (see a chain double-dashed line in FIG. 3(d)), the ECU 51 starts the main fuel injection for the first time.

If the ECU 51 predicts that the value of the fuel pressure PF will be greater than the permissible value α during the arrival time ΔT (the decision outcome of step S160 in FIG. 2 is negative), in other words, for example, if the ECU 51 predicts that the value of the fuel pressure PF will not become less than the permissible value α at the timing t4 as shown by a chain double-dashed line in FIG. 3(d), the ECU 51 executes procedures of steps S170 and S190 after performing the procedure of step S160 at the timing t3 (see FIG. 2). As a result, before the timing t4 at which the auxiliary fuel reaches each cylinder 12, each main fuel injection valve 23 is opened for the opening period T1 by the process of step S190 in FIG. 2 to inject main fuel from the main fuel injection valve 23 by a normal amount. Subsequently, in the main fuel injection control routine, the steps S110, S120, S170, and S180 or S190 are repeatedly performed in this order (see FIG. 2). After the timing t4 at which the auxiliary fuel has reached each cylinder 12, each main fuel injection valve 23 is opened for the opening period T2 that is shorter than the opening period T1 to inject fuel from the main fuel injection valve 23 by an amount that is less than the normal amount by the procedure of step S180 in FIG. 2.

Although the main fuel is injected to several cylinders 12 during the arrival time ΔT, only one main fuel injection is shown to facilitate illustration in FIG. 3(e).

The preferred embodiment provides the following advantages.

When the engine is started at a very low temperature, a large amount of fuel is required. Thus, the amount of main fuel injected from the main fuel injection valves 23 might become greater than the amount of fuel discharged from the high pressure pump 29. This might decrease the fuel pressure PF after the fuel injection is started. When, for example, auxiliary fuel enters the cylinders 12, the injection amount of main fuel decreases by the amount of the auxiliary fuel. This suppresses decrease of the fuel pressure PF. However, during the arrival time ΔT (see FIGS. 3(a) to 3(e)) from when the fuel pressure PF becomes greater than the target fuel pressure PFt (the timing t3) until the timing t4 at which the auxiliary fuel enters each cylinder 12, the auxiliary fuel injection valve 26 does not take part. Therefore, each main fuel injection valve 23 is required to inject a large amount of fuel.

In the preferred embodiment, the ECU 51 predicts whether the value of the fuel pressure PF becomes less than the permissible value α during the arrival time ΔT (see steps S150, S160) before starting to inject main fuel from the main fuel injection valves 23.

If it is predicted that the value of the fuel pressure PF does not become less than the permissible value α during the arrival time ΔT, that is, if the decision outcome of step S160 of FIG. 2 is negative, the ECU 51 starts injecting fuel from each main fuel injection valve 23 (see steps S170 to S190 of FIG. 2). That is, if it is predicted that the value of the fuel pressure PF will be less than the permissible value α by the main fuel injection of each main fuel injection valve 23, or if the decision outcome of step S160 of FIG. 2 is positive, the main fuel injection valve 23 does not start injecting main fuel although the value of the current fuel pressure PF has achieved the target fuel pressure PFt. Therefore, fuel having small fuel pressure PF is not injected from each main fuel injection valve 23. This prevents deterioration of the emission. In this case, the value of the fuel pressure PF is promptly increased since the high pressure pump 29 is driven while the main fuel injection from each main fuel injection valve 23 is stopped. If it is predicted that the value of the fuel pressure PF does not become less than the permissible value α by the main fuel injection during the arrival time ΔT, that is, if the decision outcome of step S160 of FIG. 2 is negative (see a chain double-dashed line in FIG. 3(d)), the ECU 51 starts the main fuel injection for the first time. In this case, although main fuel is injected while the auxiliary fuel has not reached the cylinder 12, the value of the fuel pressure PF does not become less than the permissible value α. Therefore, the drawback that is attributed to fuel that is injected from each main fuel injection valve 23 having a low fuel pressure PF is prevented from occurring.

As described above, the value of the fuel pressure PF is prevented from decreasing to become less than the permissible value α during the arrival time ΔT until the auxiliary fuel reaches each cylinder 12. Therefore, deterioration of emission caused because of the decrease of the fuel pressure PF to become less than the permissible value α is suppressed.

If the main fuel injection is uniformly not performed until the auxiliary fuel reaches each cylinder 12, the starting timing of the main fuel injection is delayed. However, in the preferred embodiment, the main fuel is also injected from each main fuel injection valve 23 before the auxiliary fuel reaches each cylinder 12 depending on the conditions (see the opening period T1 in FIG. 3(e)). Therefore, the delay of the starting timing is minimized.

If the value of the fuel pressure PF is reduced when the main fuel injection of the main fuel injection valves 23 is performed by the number of times corresponding to the predicted pumping number of times ΔN, the ECU 51 determines whether the value of the current fuel pressure PF becomes less than the permissible value α. As described above, the pumping number of times of the high pressure pump 29 (injection number of times of the main fuel injection valve 23) is used as a parameter related to the fuel pressure PF to predict whether the value of the fuel pressure PF becomes less than the permissible value α in advance.

The ECU 51 injects fuel required for cranking the engine 11 from each main fuel injection valve 23 until the auxiliary fuel reaches each cylinder 12. Each main fuel injection valve 23 injects fuel on the prediction that the value of the fuel pressure PF does not become less than the permissible value α. Therefore, when fuel is injected from each main fuel injection valve 23, the value of the fuel pressure PF decreases but does not become less than the permissible value α. This solves the problem that is caused because the value of the fuel pressure PF is low.

After the auxiliary fuel has reached each cylinder 12, the ECU 51 causes each main fuel injection valve 23 to inject fuel by an amount less than the amount of fuel required for cranking the engine 11. At this time, by reducing the amount of injection from the main fuel injection valve 23 taking into consideration of the amount of the auxiliary fuel, the required amount of fuel is supplied to each cylinder 12 in just proportion.

It should be apparent to those skilled in the art that the present invention may be embodied in many other specific forms without departing from the spirit or scope of the invention. Particularly, it should be understood that the invention may be embodied in the following forms.

The conditions for starting injection of the auxiliary fuel by the auxiliary fuel injection valve 26 may be modified to differ from the embodiment shown in FIGS. 1 to 3. For example, the injection may be started on condition that the starter 37 is turned on while the engine temperature is lower than a predetermined value. The injection may also be started on condition that a predetermined time has elapsed from when the starter 37 is turned on.

The conditions for stopping injection of auxiliary fuel from the auxiliary fuel injection valve 26 may be modified to differ from the embodiment shown in FIGS. 1 to 3. For example, the injection may be stopped on condition that a predetermined time has elapsed from when the starter 37 is turned on.

The present invention need not be applied to a cylinder injection type internal combustion engine that injects auxiliary fuel from a single auxiliary fuel injection valve 26 but may be applied to a cylinder injection type internal combustion engine that injects auxiliary fuel from several auxiliary fuel injection valves 26. A cylinder injection type internal combustion engine that has the single auxiliary fuel injection valve 26 is advantageous in facilitating the structure of auxiliary fuel supplying means and fuel supply control, and reducing cost.

The present invention may be applied to a cylinder injection type internal combustion engine that includes the auxiliary fuel injection valve 26 at a portion of the intake passage 17 other than the surge tank 25. The effect obtained from the present invention increases as the auxiliary fuel injection valve 26 is separated from the cylinder 12.

The ECU 51 may determine cranking of the engine 11 in accordance with the engine rotational speed NE in addition to a signal from the starter switch 38. In this case, for example, the time from when the signal is sent from the starter switch 38 till when the engine rotational speed NE becomes greater than or equal to the predetermined value is referred to as the cranking of the engine.

In the preferred embodiment shown in FIGS. 1 to 3, the detection value of the fuel pressure sensor 47 is used as the value of the fuel pressure PF. However, the value estimated in accordance with the rotational speed of the high pressure pump 29 and the driving condition of the high pressure pump 29, such as the pressure stroke, may be used as the value for the fuel pressure PF.

The present invention may be applied to an internal combustion engine that does not employ a spark ignition system as long as the engine is a cylinder injection type internal combustion engine.

The value of the target fuel pressure PFt may be a constant value. Also, the value of the target fuel pressure PFt may be variable in accordance with engine information that corresponds to the engine temperature, instead of the engine temperature, or in addition to the engine temperature. The engine information may be, for example, the outside air temperature, the intake air temperature, or the oil temperature.

Factors other than the pumping number of times of the high pressure pump 29 may be used as a parameter related to the fuel pressure PF.

Therefore, the present examples and embodiments are to be considered as illustrative and not restrictive and the invention is not to be limited to the details given herein, but may be modified within the scope and equivalence of the appended claims.

What is claimed is:

1. A fuel injection control apparatus for an internal combustion engine, wherein the internal combustion engine includes a cylinder, an intake passage, which is connected to the cylinder, a main fuel injection valve, and an auxiliary fuel injection valve, wherein the main fuel injection valve directly injects pressurized fuel, which is supplied from a high pressure pump, to the cylinder, and wherein the auxiliary fuel injection valve injects fuel to the intake passage, the apparatus comprising:

a controller for controlling the main fuel injection valve and the auxiliary fuel injection valve, wherein the controller causes the auxiliary fuel injection valve to inject fuel during cranking of the internal combustion engine and determines whether the pressure of the pressurized fuel is greater than or equal to a predetermined value, wherein the controller predicts whether the pressure of the pressurized fuel decreases below a permissible value, which is less than the predetermined value, due to injection of pressurized fuel by the main fuel injection valve during a period from a point of time after the pressure of the pressurized fuel becomes greater than or equal to the predetermined value till when fuel injected from the auxiliary fuel injection valve reaches the interior of the cylinder through the intake passage, and wherein, when the pressure of the pressurized fuel is greater than or equal to the predetermined value, and it is predicted that the pressure of the pressurized fuel will not decrease below the permissible value during the period, the controller causes the main fuel injection valve to start injecting the pressurized fuel.

2. The fuel injection control apparatus according to claim 1, wherein the controller predicts a decreasing amount of the pressurized fuel during the period based on the number of times the main fuel injection valve injects fuel during the period.

3. The fuel injection control apparatus according to claim 2, wherein the high pressure pump repeatedly executes a pumping process of pressurized fuel when the internal combustion engine is running, wherein the controller obtains the number of times the pumping process is executed during the period, and wherein the controller obtains the number of times of injection during the period based on the obtained number of times of the pumping process.

4. The fuel injection control apparatus according to claim 1, wherein, from when the injection of the main fuel injection valve is started till when the fuel injected from the auxiliary fuel injection valve reaches the interior of the cylinder, the controller causes the main fuel injection valve to inject an amount of fuel required for cranking the internal combustion engine.

5. The fuel injection control apparatus according to claim 1, wherein, after fuel injected from the auxiliary fuel injection valve has reached the interior of the cylinder, the controller causes the main fuel injection valve to inject an amount of fuel less than a required amount for cranking the internal combustion engine.

6. The fuel injection control apparatus according to claim 1, wherein the predetermined value is determined in accordance with the temperature of the internal combustion engine.

7. A fuel injection control apparatus for an internal combustion engine, wherein the internal combustion engine includes a cylinder, an intake passage, which is connected to the cylinder, a main fuel injection valve, and an auxiliary fuel injection valve, wherein the main fuel injection valve directly injects pressurized fuel, which is supplied from a high pressure pump, to the cylinder, and wherein the auxiliary fuel injection valve injects fuel to the intake passage, the apparatus comprising:

means for causing the auxiliary fuel injection valve to inject fuel during cranking of the internal combustion engine;

means for determining whether the pressure of the pressurized fuel is greater than or equal to a predetermined value during cranking of the internal combustion engine;

means for predicting whether the pressure of the pressurized fuel decreases below a permissible value, which is less than the predetermined value, due to injection of pressurized fuel by the main fuel injection valve during a period from a point of time after the pressure of the pressurized fuel becomes greater than or equal to the predetermined value till when fuel injected from the auxiliary fuel injection valve reaches the interior of the cylinder through the intake passage; and means for causing the main fuel injection valve to start injecting the pressurized fuel when the pressure of the pressurized fuel is greater than or equal to the predetermined value and it is predicted that the pressure of the pressurized fuel will not decrease below the permissible value during the period.

8. A controlling method of a fuel injection control apparatus of an internal combustion engine, wherein the internal combustion engine includes a cylinder, an intake passage, which is connected to the cylinder, a main fuel injection valve, and an auxiliary fuel injection valve, wherein the main fuel injection valve directly injects pressurized fuel, which is supplied from a high pressure pump, to the cylinder, and wherein the auxiliary fuel injection valve injects fuel to the intake passage, the method comprising:

causing the auxiliary fuel injection valve to inject fuel during cranking of the internal combustion engine;

determining whether the pressure of the pressurized fuel is greater than or equal to a predetermined value;

predicting whether the pressure of the pressurized fuel decreases below a permissible value, which is less than the predetermined value, due to injection of pressurized fuel by the main fuel injection valve during a period from a point of time after the pressure of the pressurized fuel becomes greater than or equal to the predetermined value till when fuel injected from the auxiliary fuel injection valve reaches the interior of the cylinder through the intake passage; and causing the main fuel injection valve to start injecting the pressurized fuel when the pressure of the pressurized fuel is greater than or equal to the predetermined value, and it is predicted that the pressure of the pressurized fuel will not decrease below the permissible value during the period.

9. The method according to claim 8, further comprising predicting a decreasing amount of the pressurized fuel during the period based on the number of times the main fuel injection valve injects fuel during the period.

10. The controlling method according to claim 8, wherein the high pressure pump repeatedly executes pumping process of the pressurized fuel when the the internal combustion engine is running, the controlling method further comprising:

obtaining the number of times the pumping process is executed during the period; and obtaining the number of times of injection during the period based on the obtained number of times of the pumping process.

11. The controlling method according to claim 8, further comprising injecting an amount of fuel required for cranking the internal combustion engine from the main fuel injection valve from when the injection of the main fuel injection valve has started till when the fuel injected from the auxiliary fuel injection valve reaches the interior of the cylinder.

12. The controlling method according to claim 8, further comprising injecting an amount of fuel less than the required amount for cranking the internal combustion engine from the main fuel injection valve after the fuel injected from the auxiliary fuel injection valve reaches the interior of the cylinder.

* * * * *